US007992292B2

(12) United States Patent
Yang

(10) Patent No.: US 7,992,292 B2
(45) Date of Patent: Aug. 9, 2011

(54) METHOD FOR MANUFACTURING A TOUCH PANEL

(76) Inventor: Kai-Ti Yang, Taipei (TW)

( * ) Notice: Subject to any disclaimer, the term of this patent is extended or adjusted under 35 U.S.C. 154(b) by 644 days.

(21) Appl. No.: 12/127,813

(22) Filed: May 27, 2008

(65) Prior Publication Data

US 2009/0293261 A1    Dec. 3, 2009

(51) Int. Cl.
*H05K 3/20* (2006.01)
(52) U.S. Cl. ............... 29/831; 29/830; 29/846; 345/33
(58) Field of Classification Search ............... 200/5 A, 200/512; 345/33, 173, 178; 349/12, 187; 29/622, 830, 831, 846, 412–415
See application file for complete search history.

(56) References Cited

U.S. PATENT DOCUMENTS 6,380,497 B1 * 4/2002 Hashimoto et al. ............ 29/622
7,259,804 B2 * 8/2007 Yu et al. ......................... 349/12

* cited by examiner

*Primary Examiner* — Donghai D. Nguyen

(57) ABSTRACT

A method for manufacturing a touch panel for acquiring a plurality of touch panels in one machining process comprises the steps of: sticking a rectangular transparent film to a back liner as to be formed with an upper material piece; each upper electrode unit of the transparent film being formed with a closed gluing frame along an inner periphery of the cutting line; forming a plurality of lower electrode units with an identical specification as the upper electrode units on the transparent film on a surface of the glass substrate; sticky a surface of each upper electrode unit on the transparent film to a surface of a respective lower electrode unit on the glass substrate by the gluing frame; a glass cutter cutting along a cutting line into one lateral side of the surface on the glass substrate; performing a piece peeling operation so as to acquire each touch panel.

8 Claims, 5 Drawing Sheets

METHOD FOR MANUFACTURING A TOUCH PANEL

FIELD OF THE INVENTION

The present invention relates to a method for manufacturing a touch panel, in that a transparent film is glued to a back liner. The transparent film and a glass substrate are installed with a plurality of resistor films, and sticky films. Then, the transparent film is cut into units with required specification. These units are still left on the back liner. Then the surfaces of the transparent film and the glass substrate with resistor films are closely glued together. By a cutter, a trench is formed on the glass substrate along a cutting line and a cutting device is used to break the glass substrate along the trench. Finally, each touch panel is separated from the back liner. Thus, touch panels are acquired.

BACKGROUND OF THE INVENTION

As it is known, touch panels will be widely arranged on the frames of liquid crystal displays (LCD) or cathode ray tube (CRD). Thereby, the user may press the panel by a finger or a tip of a pen according to the indication on the screen so as to input required message.

In the structures of general touch panels, for example, resistor type touch panel, two resistor films expanding like a surface are spaced with a gap therebetween. In general, the upper resistor films are arranged at a surface of a transparent film, and the lower resistor films are arranged on the glass substrate. The peripheries of the matching surfaces of the transparent film and the glass substrate are coated with glues for tightly combining the two.

In the manufacturing method of the aforesaid touch panels, in the early time, the touch panels are produced one by one. Namely, the aforesaid transparent film and the glass substrate are cut as several units with a desired specification. Then, each separated unit is performed with the machining work of arranging a resistor film, gluing, etc. Then, the separated transparent film and glass substrate are combined so as to complete the manufacturing of a touch panel. In the prior art, each unit is performed with above manufacturing steps. The work is complex so that the work, time and cost are high. Furthermore, mass production can not be executed. Moreover, since many steps are required, the alignment of the work pieces becomes a critical point in the process. While in the aforesaid working process, the machining material is divided into small pieces, and thus, the work of alignment is hard. This is not only a bottleneck in technology, but also the yield ratio is reduced.

In order to improve aforesaid problem, some improvements have been disclosed. One of the improvement is that the transparent film and the glass substrate are integral pieces with larger area. At first, each piece is arranged with conductive films and glues. Then, the transparent film and glass substrate are tightly combined by gluing. Then, a cutter cuts the transparent film from the upper side for separating each film layer. Meanwhile, a cut cuts the bottom of the glass substrate so as to be formed with trenches for cutting. Finally, the trenches of the glass substrate are cut to be formed with a plurality of touch panels.

However, aforesaid transparent film is a material with strong flexibility and in general, the uppermost layer thereof is coated with a hard coating for preventing sliding and cracking. Therefore, in the manufacturing process, since the material has a strong flexibility, it can not be cut easily so that the tight adhesion structure is destroyed. Furthermore, at two sides of the cutting line of the transparent film, the hard coating layer is possibly peeled away.

In the aforesaid process, cutters are used to cut the upper side of the transparent film and the bottom of the glass substrate. Therefore, the alignment of the cut line of the transparent film and the trenches of the glass substrate is very important. However, in general, the widths of the cutting line and trenches are very slender so that the alignment is very hard. Although in the aforesaid cutting process, a cutter directly cuts the upper side of the transparent film, and at the same time the glass substrate is cut to be formed with trenches for resolving the alignment problem. In this way, the cutter is used to cut two materials of different properties so that the cutter will become dull and thus the cutting edge will be disorder. Moreover, the trench of the glass substrate has slightly cracks so that the strength is deteriorated sincerely. Therefore, it is not practical.

SUMMARY OF THE INVENTION

Accordingly, the primary object of the present invention is to provide a method for manufacturing a touch panel with a high producing efficiency so that in one machining process, several or several tens of touch panels can be produced so that the producing efficiency is increased greatly and thus the cost in time and labor is saved.

Another object of the present invention is to provide a method for manufacturing a touch panel, wherein in each machining process, the back liner may connect the separated working pieces, for example, the separated upper electrode unit, so as to retain with a piece having a larger area. It is not only used to prevent from the disorder condition in the machining process, but also the producing efficiency is improved. Furthermore, the alignment of the working pieces can be performed easily. As a result, the yield is increased.

To achieve the objects, the present invention provides a method for manufacturing a touch panel for acquiring a plurality of touch panels in one machining process, comprising the steps of: sticking a rectangular transparent film to a back liner as to be formed with an upper material piece; wherein the transparent film of the upper material piece is formed with a plurality of upper electrode units; a cutter cutting the transparent film of the upper material piece wherein the back liner is not broken completely so that the divided upper electrode units remains on the back liner and the whole material piece retains the original large area; each upper electrode unit of the transparent film being formed with a closed gluing frame along an inner periphery of the cutting line; forming a plurality of lower electrode units with an identical specification as the upper electrode units on the transparent film on a surface of the glass substrate; sticky a surface of each upper electrode unit on the transparent film to a surface of a respective lower electrode unit on the glass substrate by the gluing frame; a glass cutter cutting along a cutting line into one lateral side of the surface on the glass substrate so as to be formed with a trench; performing a piece peeling operation so as to acquire each touch panel. Therefore, a plurality of touch panels may be acquired in one machining process.

The various objects and advantages of the present invention will be more readily understood from the following detailed description when read in conjunction with the appended drawing.

DETAILED DESCRIPTION OF THE PREFERRED EMBODIMENTS

Figure 1:
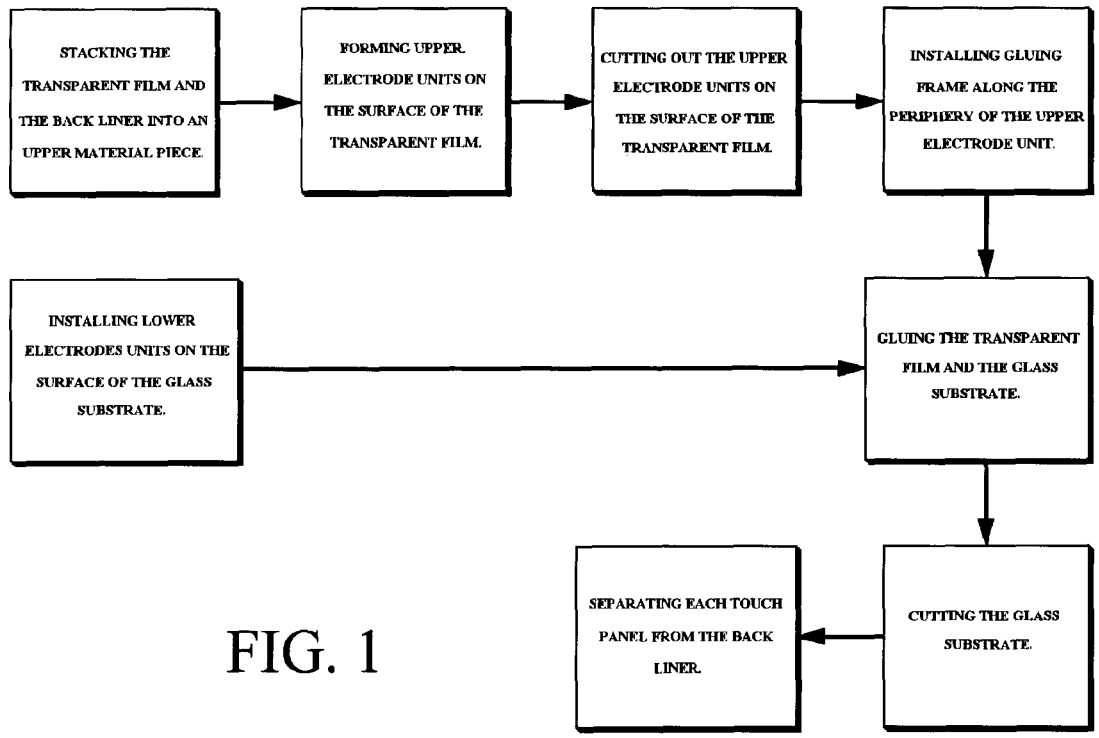
FIG. 1 is a block diagram of the machining process of the present invention.
Figure 2:
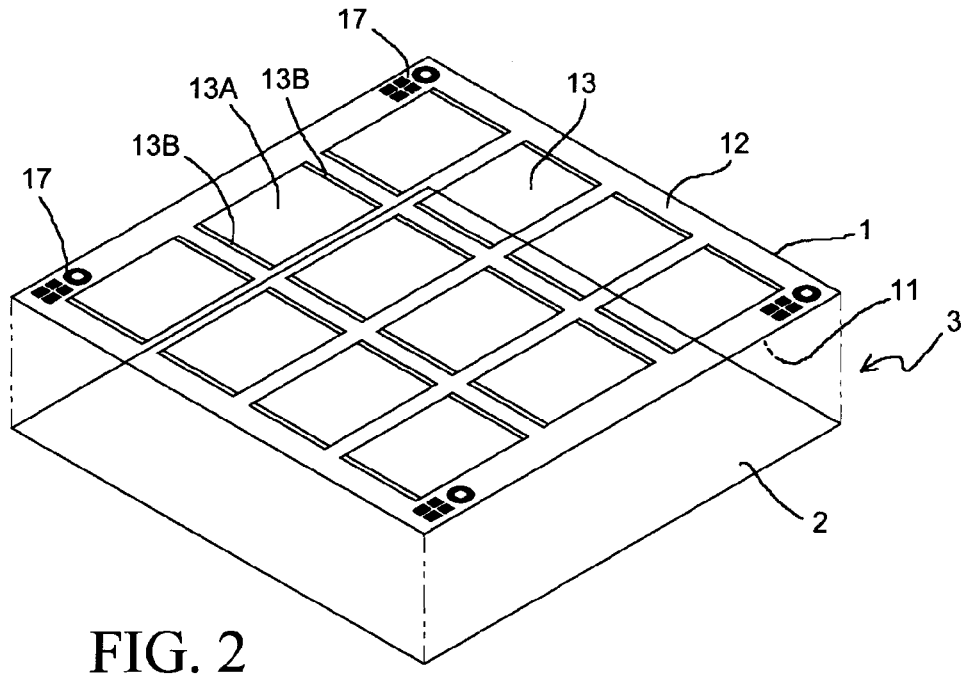
FIG. 2 is an exploded perspective view of the upper material piece in the present invention, wherein the installation of the upper electrode units on the transparent film is illustrated in detail.

Referring to FIG. 2, the method for manufacturing a touch panel according to the present invention is illustrated. In the present invention, a rectangular transparent film 1 with a large area has a hard coating surface 11 which is stuck to a back liner (PET) 2 with the same specification so as to be formed with an upper material piece 3. The transparent film 1 of the upper material piece 3 is exposed with a surface 2. The surface 12 is formed with twelve upper electrode units 13 arranged in order. The upper electrode unit means an area necessary for input and being on the whole surface of the transparent film 1, which includes a transparent resistor film 13A and a bus electrode 13B.

Figure 3:
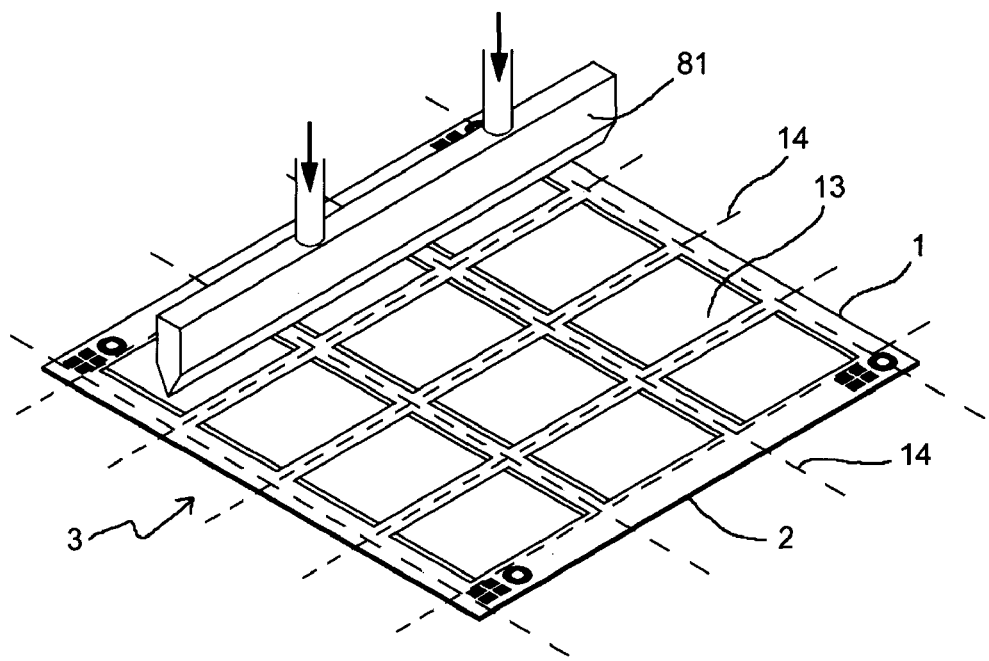
FIG. 3 is a schematic view showing the process of cutting the transparent film according to the present invention, wherein it is illustrated that the cutter cut the transparent film along a predetermined cutting line.
Figure 5:
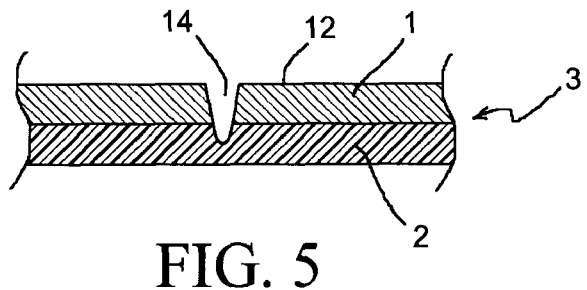
FIG. 5 is a cross sectional view of the upper material piece in the present invention, wherein the cut transparent film and the back liner are illustrated.

Referring to FIG. 3, a cutter 81 cuts along the cutting line 14 at the lateral edge of the transparent film 1 of the upper material piece so that the piece layer of the transparent film 1 is cut completely for dividing various regions for the upper electrode units 13. The back liner 2 is not broken (referring to FIG. 5) completely so that the divided upper electrode units 13 remains on the back liner 2. By the supporting the back liner 2, the whole upper material piece 3 remains the original rectangular piece not being cut so that the succeeding work can be performed conveniently.

Figure 6:
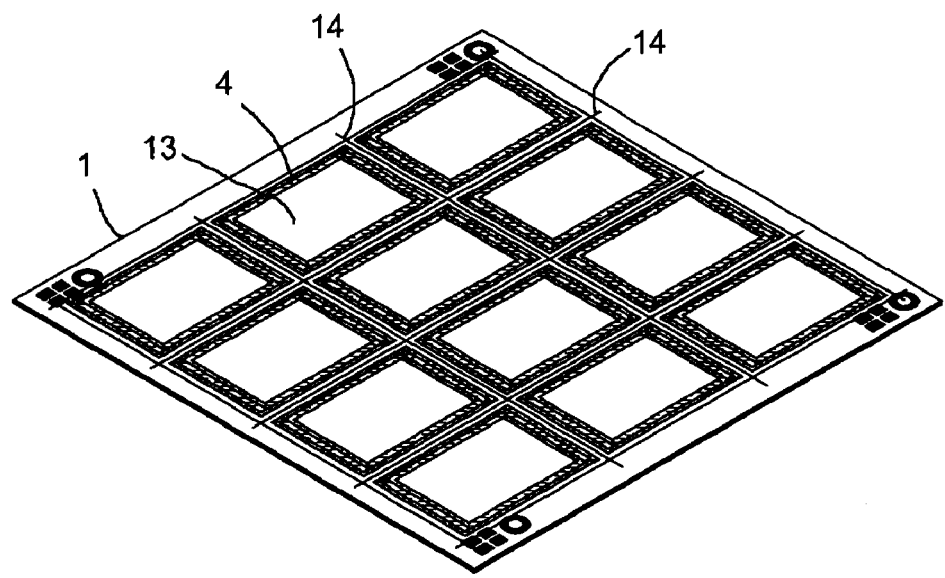
FIG. 6 is a perspective view showing the upper material piece of the present invention, wherein a gluing frame is installed at an inner periphery of the upper electrode unit of the present invention is shown.

Referring to FIG. 6, each upper electrode unit 13 of the transparent film 1 is added with glue along the inner periphery of the cutting line 14 so as to be formed as a closed gluing frame 4. In order to match special requirement, the gluing frame 4 is used with a conductive glue as for example being used to the bus electrode 13B in order that the portion is conductive as the gluing frame 4 is adhered thereon.

Figure 7:
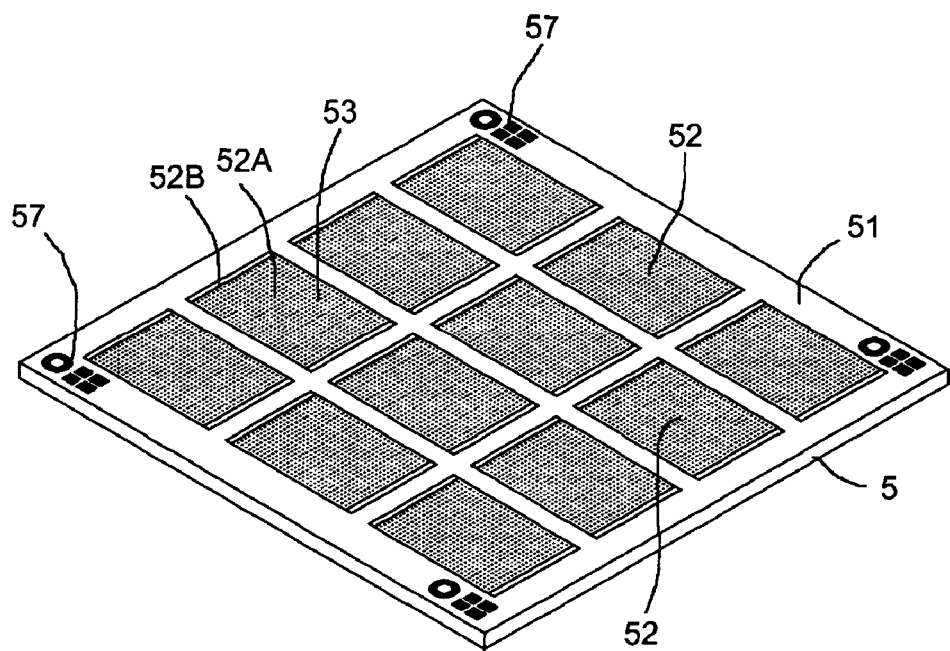
FIG. 7 is a perspective view of the glass substrate in the present invention, wherein the lower electrode units below the glass substrate are shown.

Besides, as shown in FIG. 7, a gluing frame 4 with a specification matching to the upper material piece 3, twelve lower electrode units 52 symmetrical to the upper electrode units 13 are formed on a surface 51 of the glass substrate 5. The lower electrode unit means an area necessary for input and being on the whole surface of glass substrate, which includes an transparent resistor film 52A and a bus electrode 52B.

Next, the surface 12 of the transparent film is stuck with the surface 51 of the glass substrate by the gluing frame 4. In this condition, each upper electrode unit 13 of the transparent film 1 and each lower electrode unit 52 of the glass substrate 5 is left with a spacing within the range of transparent resistor films 13A and 52A by protruded spacers 53. Meanwhile, the upper electrode units 13 and the bus electrodes 52 of the upper and lower electrode units are electrically connected through the conductive glue therebetween.

Figure 8:
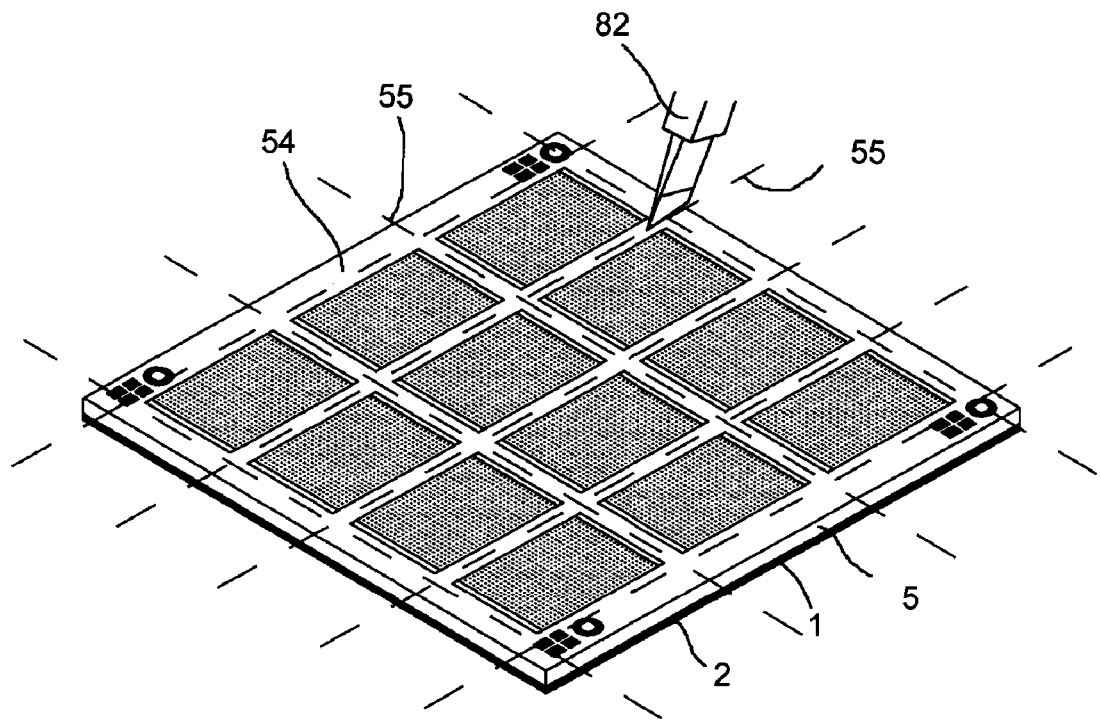
FIG. 8 is a schematic view showing that the trench on the glass substrate is cut, wherein the glass cutter cut the transparent film along a predetermined cutting line.
Figure 9:
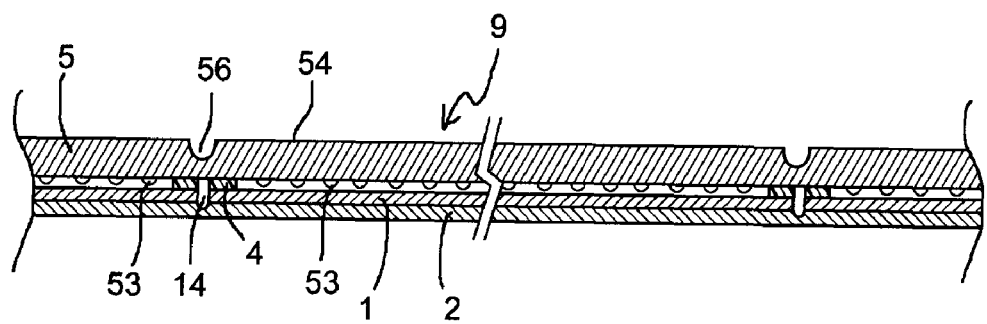
FIG. 9 is a schematic view of the touch panel in the manufacturing process of the present invention, wherein the cut glass substrate on the touch panel is illustrated.

Next, a glass cutter 82 cuts along a cutting line 52 into one lateral side of the surface 54 on the glass substrate and has no gluing connecting to the transparent film 1 so as to be formed with a trench 56 (referring to FIGS. 8 and 9) matching the cutting line 14 on the transparent film. Next, a piece peeling operation is performed along the trench 56 of the glass substrate so as to cut the glass substrate into several required units. Finally, the units remain on the back liner 2 are separated one by one so as to acquire each touch panel.

The aforesaid resistor film touch panel is arranged on the frame of a liquid crystal display or a cathode ray tube. Thereby, the user may press the panel by a finger or a tip of a pen according to the indication on the screen, and thus through the protruding spacers 53, the matched upper electrode unit 13 and lower electrode unit 52 are touch with one another for detecting the pressing position. Thereby, a position input is performed.

In the method for manufacturing a touch panel, the transparent film 1 is formed by polycarbonic acid esters, polyamide, . . . . Further, base on special requirements, the transparent film 1 may be formed by overlaying multiple layers for substituting a single one film. Furthermore, the hard coating layer on the aforesaid transparent film may be a hard resin of acrylic epoxy acid, preferably, one surface of the hard coating layer is abrasive by forming micro-particles thereon for preventing sparkle being formed on the surface. Furthermore, the protruding spacers 53 are formed on either or both surfaces of the upper electrode unit 13 or the lower electrode unit 52. The protruding spacers are spaced with one another with gaps and are arranged in order.

Figure 4:
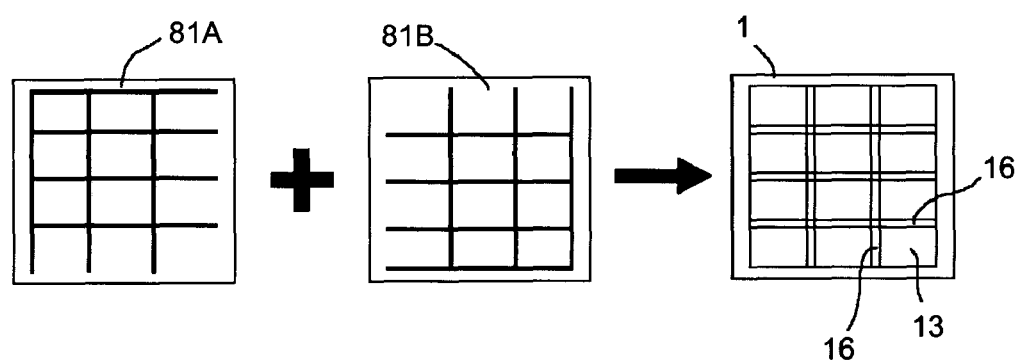
FIG. 4 is a schematic view of another the present invention for performing a cutting process to the transparent film according to the present invention, wherein two sets of cutting molds cutting the transparent film and cutting line on the transparent film are illustrated.

Furthermore, in the cutting process of the transparent film 1, preferably, two sets of cutting molds 81A and 81B with compensated cutting textures are used to cut the transparent film 1 of the upper material piece twice, as shown in the FIG. 4. As a result, other than the required area of the upper electrode units 13 are cut, the residue material 16 in the gaps of each upper electrode unit 13 is separated therefrom.

Moreover, in the operation of closely gluing the surface 12 of the transparent film with the surface 51 of the glass substrate, a slope of 15 degrees can be retained between the gluing surfaces of the two so that the two may be combined with one another and thus air therebetween can be driven out so that after gluing, the two may be adhered tightly.

Figure 10:
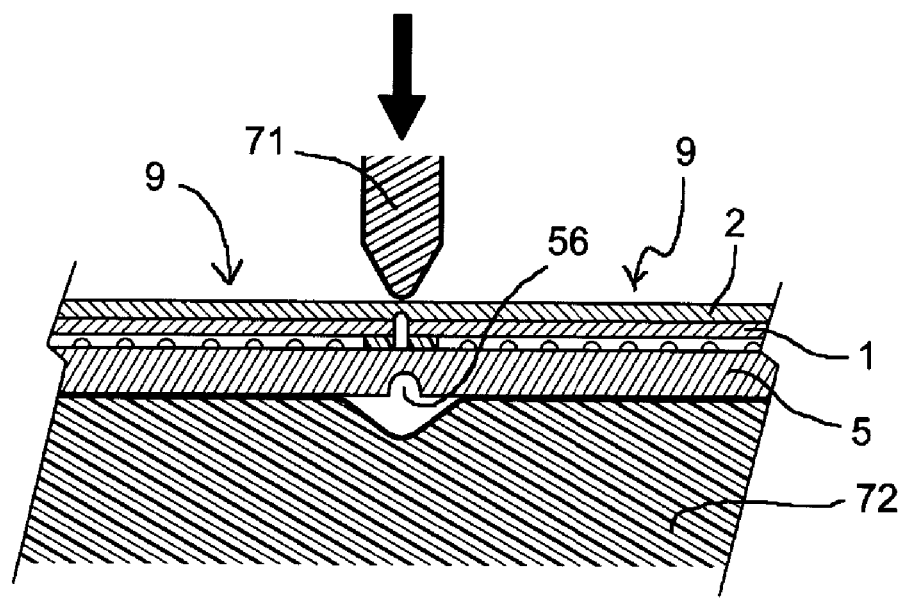
FIG. 10 is a schematic view showing that a peeling process to the glass substrate is performed in the present invention.
Figure 11:
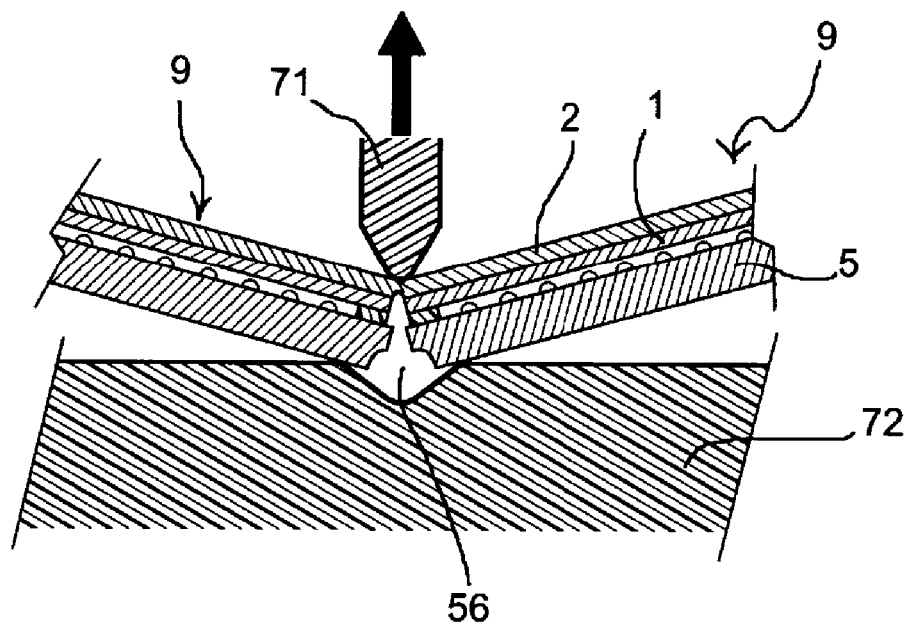
FIG. 11 is a schematic view showing that a peeling process to the glass substrate is performed in the present invention, wherein it is illustrated that the glass substrate is divided along a predetermined cutting line.

Furthermore, according to the aforesaid manufacturing process, after the trench 56 is formed in the cutting line 55 of the glass substrate, in the succeeding process of breaking the glass substrate, preferably, a pair of punching head 71 and molding substrate 72 with proper flexibility are used to be aligned to the trench 56 of the glass substrate. Then, the punching head is pressed from one side of the back liner 2 (referring to FIG. 10) so that the glass substrate is pressed along a preset cutting line 55 to be formed with touch panels 9, as shown in the FIG. 11.

Especially, in the present invention, the back liner 2 is used to protect the transparent film 1 to prevent the surface 11 from scratching or wearing in each machining process. Furthermore, in each machining process, the back liner 2 may connect the separated working pieces, for example, the separated upper electrode unit 13, so as to retain with a piece having a larger area. It is not only used to prevent the disorder condition in the machining process, but also the producing efficiency is improved. Furthermore, the alignment of the working pieces can be performed easily. As a result, the yield is increased.

Another, in order that the products have a higher precision, in the present invention, the lateral edges on the surfaces of the transparent film 1 and the glass substrate 5 are formed with targets 17 and 57 (referring to FIGS. 2 and 7) for alignment of working pieces in the machining process. For example, in the manufacturing process of gluing the surface 12 of the transparent film and the surface 51 of the glass substrate, the upper and lower electrode units 13 and 52 are aligned, in that, the target 17 on the transparent film 1 and the target 57 on the glass substrate are used as the aligning points for positioning. For example, the aforesaid manufacturing process of dividing each upper electrode unit 13 from the transparent film 1 and the installing trench 56 on the glass substrate is according to the targets 17 and 57 so as to determine the cutting lines 14 and 55. Thereby, after cutting, a uniform and precise touch panel 9 is formed.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for manufacturing a touch panel for acquiring a plurality of touch panels in one machining process, comprising the steps of:
   a) sticking a rectangular transparent film to a back liner as to form an upper material piece; wherein the transparent film of the upper material piece is exposed with a surface which is formed with a plurality of upper electrode units being arranged in order;
   b) using a cutter to cut the transparent film of the upper material piece so that the layer of the transparent film is cut completely for dividing various regions for the upper electrode units; wherein the back liner is not completely cut so that the divided upper electrode units remains on the back liner;
   c) forming a closed gluing frame on each upper electrode unit of the transparent film along an inner periphery of a cutting line;
   d) forming a plurality of lower electrode units each having an identical specification as the upper electrode units of the transparent film on a surface of a glass substrate;
   e) adhering a surface of each upper electrode unit on the transparent film to a surface of a respective lower electrode unit on the glass substrate by the gluing frame;
   f) using a glass cutter to cut along the cutting line into one lateral side of the surface on the glass substrate so as to form a trench in the glass substrate;
   g) performing a piece peeling operation along the trench of the glass substrate so as to cut the glass substrate into several required units; and then separating the required units, which remained on the back liner one by one so as to acquire each touch panel.

2. The method for manufacturing a touch panel as claimed in claim 1, wherein the upper electrode unit is an area necessary for input and being on a whole surface of the transparent film and includes a transparent resistor film and a bus electrode.

3. The method for manufacturing a touch panel as claimed in claim 1, wherein glue is used in the gluing frame used in a bus electrode.

4. The method for manufacturing a touch panel as claimed in claim 1, wherein the lower electrode unit is an area necessary for input and being on the whole surface of glass substrate and includes a transparent resistor film and a bus electrode.

5. The method for manufacturing a touch panel as claimed in claim 1, wherein in the cutting of the transparent film, two sets of cutting molds with compensated cutting textures are used to cut the transparent film of the upper material piece twice, as a result, other than a required area of the upper electrode units are cut, residue material in gaps of each upper electrode unit is separated therefrom.

6. The method for manufacturing a touch panel as claimed in claim 1, wherein in adhering the surface of the transparent film with the surface of the glass substrate, a slope of 15 degrees can be retained between the gluing surfaces of the transparent film and the glass substrate so that the transparent film and the glass substrate are combined with one another and thus air therebetween is driven out so that after gluing, the two are adhered tightly.

7. The method for manufacturing a touch panel as claimed in claim 1, wherein in the separating the required units one by one, a pair of punching head and molding substrate with proper flexibility are used to be aligned to the trench of the glass substrate; then, the punching head is pressed from one side of the back liner so that the glass substrate is pressed along a preset cutting line to be formed with touch panels.

8. The method for manufacturing a touch panel as claimed in claim 1, wherein lateral edges on the surfaces of the transparent film and the glass substrate are formed with targets for aligning the transparent film and the glass substrate in the machining process.

* * * * *